United States Patent [19]
Bennett

[11] Patent Number: 5,574,319
[45] Date of Patent: Nov. 12, 1996

[54] SWITCHING DEVICES

[76] Inventor: Neil W. Bennett, 19916 - 190th Ave. NE., Woodinville, Wash. 98072

[21] Appl. No.: 388,710

[22] Filed: Feb. 15, 1995

[51] Int. Cl.⁶ ........................................... H02B 1/24
[52] U.S. Cl. .................. 307/114; 307/112; 307/113; 327/365; 327/445; 327/446
[58] Field of Search .................... 307/112, 113, 307/114; 327/365, 445, 446

[56] References Cited

U.S. PATENT DOCUMENTS

3,418,489  12/1968  Platzer ................................ 307/114
3,496,379  2/1970  Platzer ................................ 307/114

*Primary Examiner*—William M. Shoop, Jr.
*Assistant Examiner*—Albert W. Paladini
*Attorney, Agent, or Firm*—Hughes, Multer & Schacht, P.S.

[57] ABSTRACT

Plug-in electrical switching devices which allow a load device to be electrically connected to and disconnected from an electrical power source at either: (a) a switched outlet electrically coupled between the power source and the load and (b) a location in the vicinity of the load.

17 Claims, 5 Drawing Sheets

SWITCHING DEVICES

The present invention relates to novel devices which allow lamps and other electrical load devices to be turned on and off from either of two locations and then turned off or on from either of the locations.

In an exemplary application, the present invention allows a bedside lamp to be turned on and off at a location near the bed and by a wall switch adjacent a door to a room in which the lamp is located. The principles of the present invention will be developed primarily with respect to that application. This is being done for the sake of convenience and clarity and is not intended to limit the scope of the invention as defined in the appended claims.

BACKGROUND OF THE INVENTION

It is common for a lamp to be plugged into a switched outlet so that, if the lamp switch is on, the lamp can be turned on and off by an outlet-controlling switch located remote from the outlet, typically at a door to a room in which the lamp is to be employed. This makes it possible to turn the lamp on from the doorway and to then turn the lamp off from the bedside or other location in which it is placed. This conventional arrangement leaves much to be desired. For example, if the lamp switch is left off, the lamp cannot be turned on by the wall switch and one may be faced with a potentially hazardous journey across a darkened room.

Electrical control devices designed to remedy the problems just described by making it possible in some circumstances to turn the load device on or off with a switch at one location even though the load device may have previously been placed in the opposite state with a switch at a second location have been disclosed. U.S. Pat. Nos. 2,477,862 issued 2 Aug. 1949 to Cook for HOUSE WIRING CIRCUITS; 3,418,489 issued 24 Dec. 1968 to Platzer, Jr. for SWITCHING CIRCUIT; 3,872,319 issued 18 Mar. 1975 to Platzer, Jr. for LAZY-MAN TYPE SWITCHING CIRCUIT; 4,383,186 issued 10 May 1983 to Liang for ELECTRICAL SWITCHING APPARATUS; 4,578,593 issued 25 March 1986 to Davidov for TWO-WAY ELECTRICAL CONTROL MODULE FOR A LAMP OUTLET disclose devices and systems of the just-described character.

The devices disclosed in the above-cited patents have a number of disadvantages such as complexity in installation and, more importantly, the inability to turn the controlled load device on (or off) in particular ones of the circumstances in which it would be highly desirable to do so. As a consequence, there is a continuing need for an electrical control device which can be readily installed between a controlled wall outlet and a load device and which allows the load device to be turned on and off from either of two locations in virtually any circumstance which may be encountered.

SUMMARY OF THE INVENTION

There have now been invented and disclosed herein certain new and novel electrical control devices which do not have the disadvantages of those heretofore available for the purposes discussed above. The installation of those devices is extraordinarily simple. The male lead from the device is plugged into the switched outlet, and the cord of the lamp or other load device is plugged into a second lead from the control device.

The operating circuitry of the novel control devices disclosed herein allows the load device to be turned on and off from the outlet controlling switch. Conversely, the control device can be employed to turn the load device on or off if the outlet controlling switch is on. By virtue of an onboard power supply, the operating circuitry of the control device is maintained for a period of time determined by the capacity of that power supply such that the load device will maintain its state if the outlet controlling switch is first turned off for a shorter period of time and then back on.

The important objects, features, and advantages of the present invention will be apparent to the reader from the foregoing and the appended claims and as the ensuing detailed description and discussion proceeds in conjunction with the accompanying drawings.

DETAILED DESCRIPTION OF THE INVENTION

Figure 1:
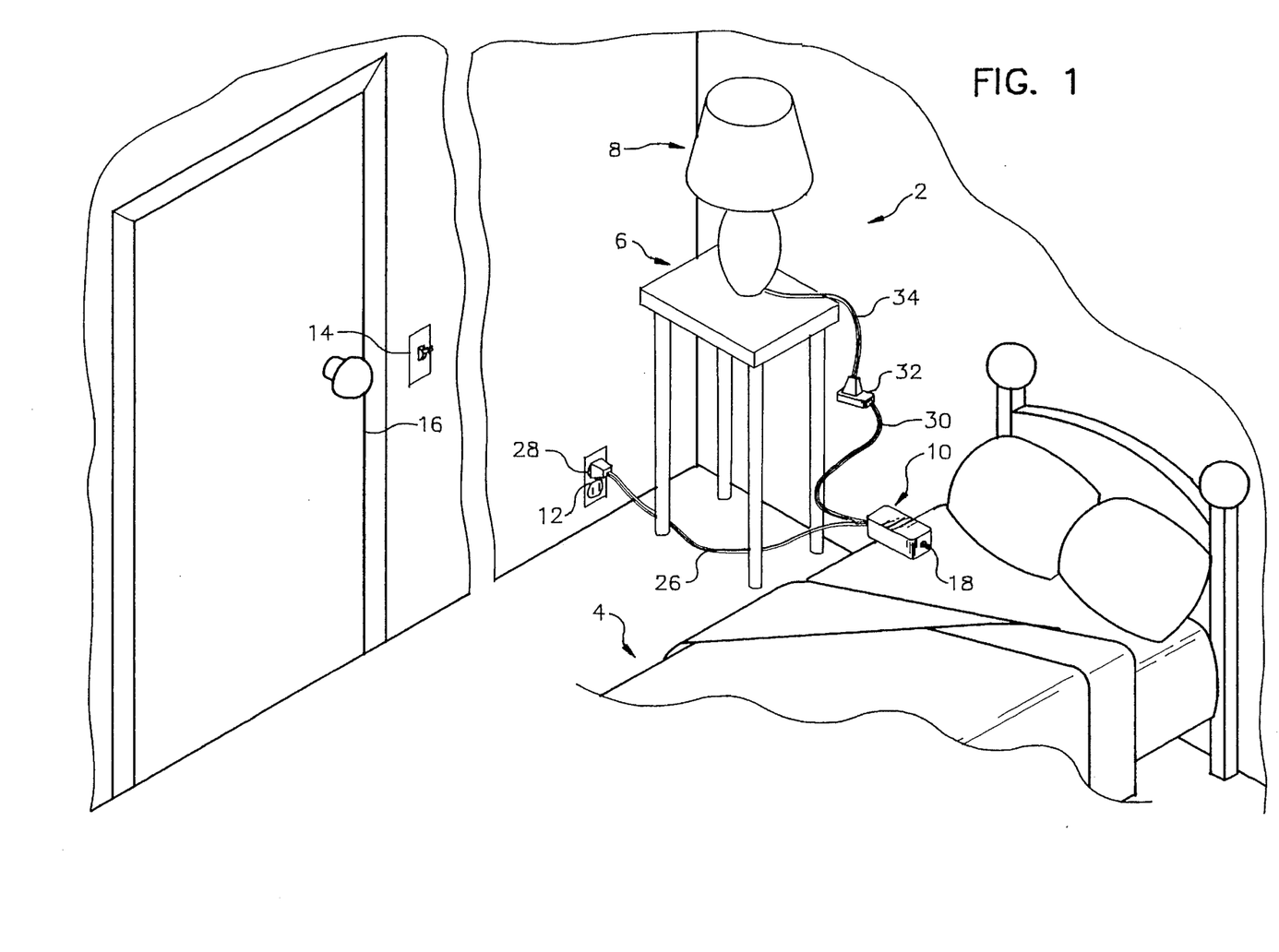
FIG. 1 is a pictorial view of a bedroom equipped with a lamp which can be turned on and off from a wall switch or with the switch of a control device constructed in accord with and embodying the principles of the present invention.

Referring now to the drawing, FIG. 1 depicts a bedroom 2 furnished with a bed 4 and a nightstand 6 for a bedside lamp 8. Also depicted in FIG. 1 is a novel switching device 10 constructed in accord with the principles of the present invention. Switching device 10 is connected between a switched wall outlet 12 and lamp 8. Switching device 10 allows lamp 8 to be turned ON and OFF by manipulating a wall switch 14 which controls the flow of current to switched outlet 12. Switch 14 is located adjacent bedroom door 16 at a location remote from lamp 8 and bed 4. With power available at outlet 12, lamp 8 can also be turned ON and OFF by manipulating a biased closed, pushbutton switch 18 which is a component of switching device 10. Switching device 10 is so constructed that either of the switches 14 and 18 can be used to turn lamp 8 ON or OFF even though the lamp was previously placed in the opposite state by the other switch if switch 14 is ON.

Figure 2:
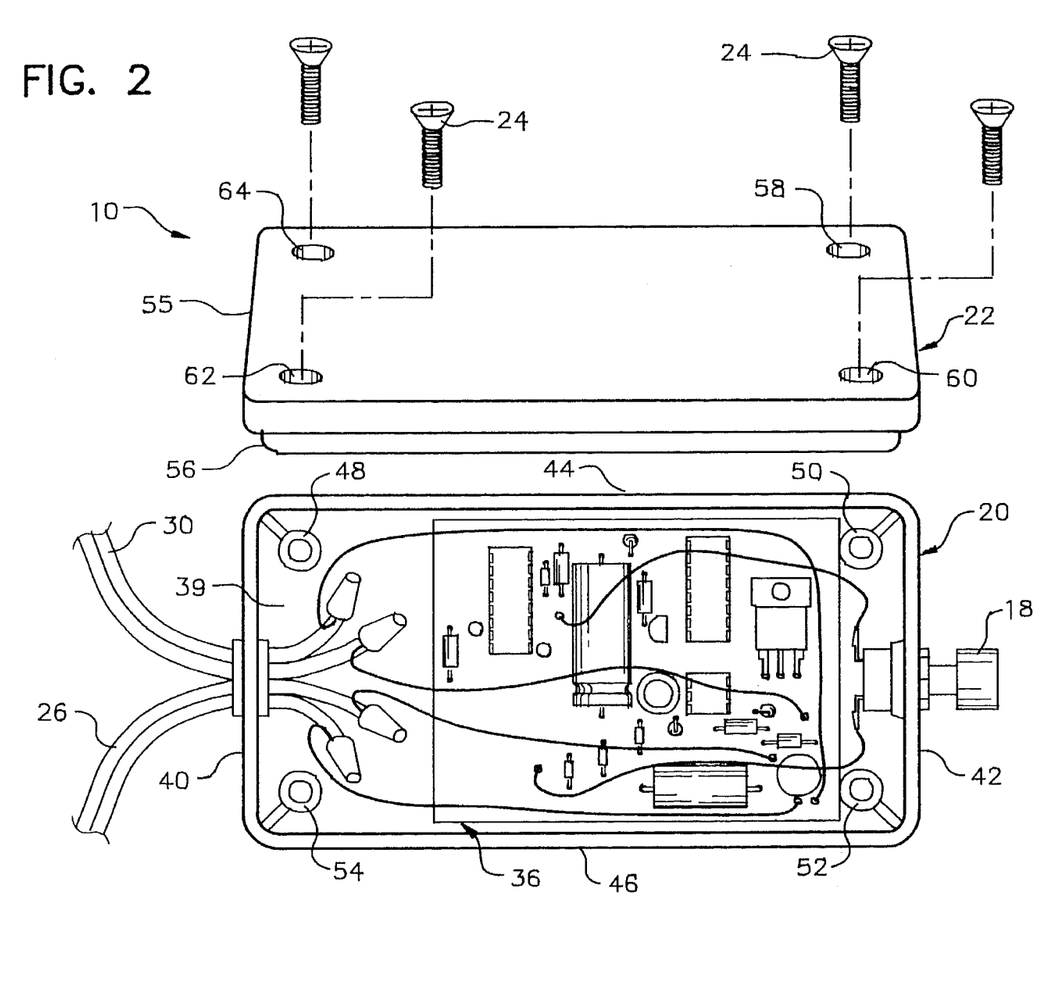
FIG. 2 is a plan view of the control device with the cover removed to show its internal components.

Turning next to FIG. 2, switching device 10 also includes a casing 20, a cover 22, fasteners 24 for securing cover 22 to casing 20, a line cord 26 which terminates in a male plug 28 (see FIG. 1) for connecting switching device 10 to wall outlet 12, and a second line cord 30. Line cord 30 terminates in a female plug 32 (see FIG. 1), and the line cord 34 from lamp 8 is plugged into female plug 32.

A final component of switching device 10, housed in casing 20, is a printed circuit board 36. That board contains the operating circuit 38 (See FIG. 5) for switching device 10.

Referring still to FIG. 2, casing 20 and cover 22 of switching device 10 will typically be molded from an appropriate polymer. Casing 20 is an open top box with a bottom wall 39 and integral side and end walls 40 . . . 46 which extend normally from bottom wall 39. At the four corners of the casing are integral, internally threaded bosses 48 . . . 54 which also extend normally from the bottom wall 39 of the casing.

The complementary cover 22 of switching device 10 has two, integral, superimposed segments 55 and 56. Segment 55 has the same configuration and dimensions as the exterior of casing 20 and is designed to sit on the upper edges of casing side and end walls 40 . . . 46. The associated cover segment 56 fits within the side and end walls and positions the cover on casing 20. Fasteners 24 are installed through apertures 58 . . . 64 in cover 22 and threaded into bosses 48 . . . 54 to retain the cover in place.

The operating circuit 38 for switching device 10 (depicted schematically in FIG. 5) includes a DC power supply 70 composed of a full wave rectifier 72, a dropping resistor 74, and a zener diode 76. Power supply 70 converts the 115 V AC signal available from AC power source 78 at switched outlet 12 to a fully rectified, direct current signal clipped to 5 V.

Figure 5:
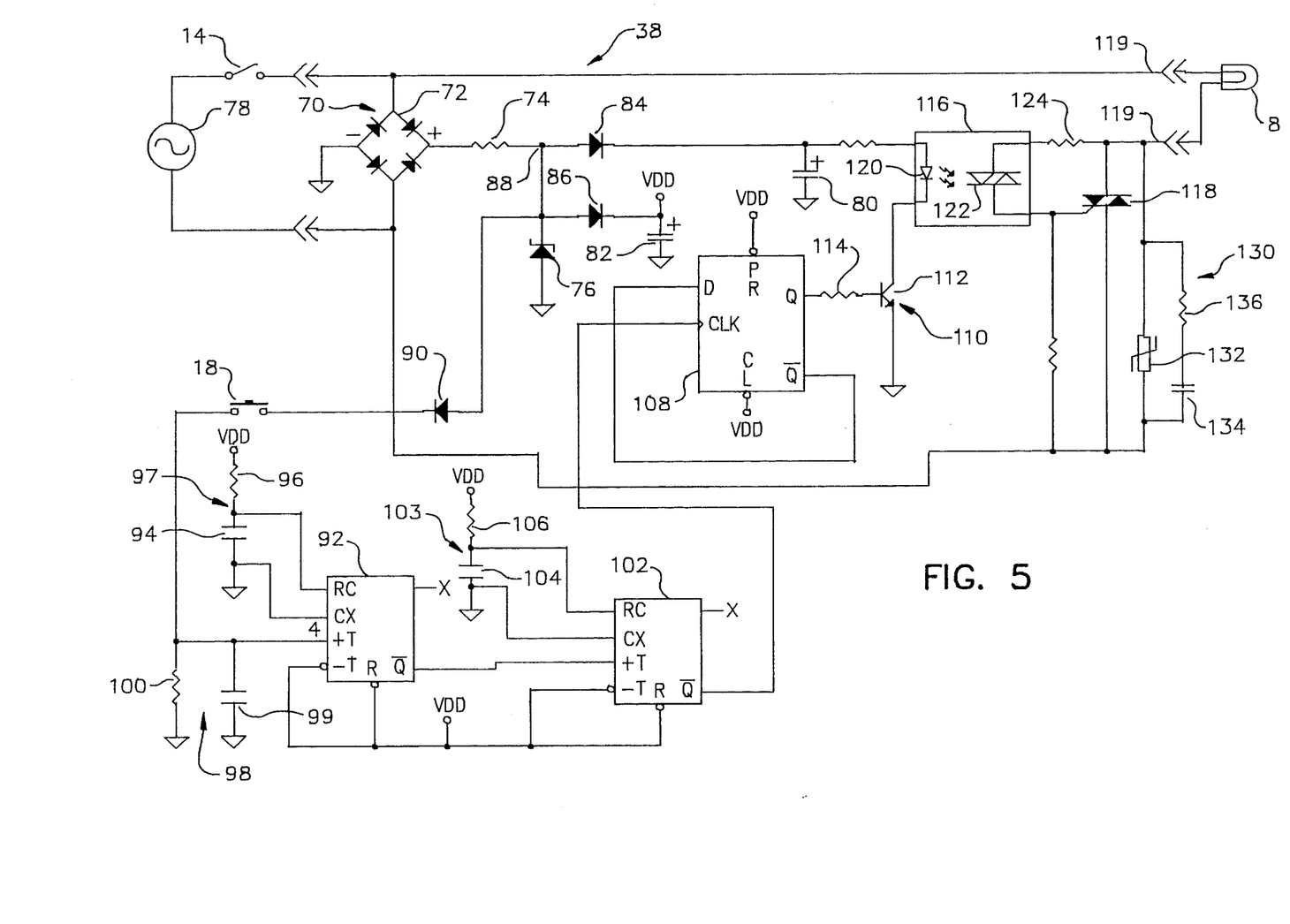
FIG. 5 is an electrical schematic of the operating circuit for the control device of FIG. 2.

The 5 V signal is routed to capacitors 80 and 82 through diodes 84 and 86 to charge those capacitors. Capacitor 80 is a power supply for the hereinafter described driver of an electronic load switch which completes and interrupts a load circuit between power supply 78 and lamp 8 when wall switch 14 is closed. Capacitor 82 serves as a power supply of limited duration for operating circuit 38 in those circumstances in which wall switch 14 is displaced to and left in the illustrated open position and power is consequentially not available at wall outlet 12.

Diodes 84 and 86 isolate capacitors 80 and 82 from power supply 70 and from those operating circuit components they are not designed to power.

The 5 V power available at the junction 88 between resistor 74 and zener diode 76 is also made available through diode 90 to the biased closed, manually actuatable switch 18 of switching device 10. Switch 18 is in turn connected to input pin 4 of the one-shot or monostable vibrator 92.

Referring still to FIG. 5, capacitor 94 and resistor 96 constitute a timing circuit 97 for one-shot 92. As long as the one-shot is triggered from junction 88 and powered from capacitor 82, the timing circuit will keep the one-shot in the ON state. The output of one-shot 92 triggers the input of one-shot 102 such that changes in the state of one-shot 92 will trigger a momentary change in the state of one-shot 102. The change in the output of one-shot 102 will cause a reversal of flip-flop 108. Thereafter, flip-flop 108 will remain in its state until a subsequent signal of like character is applied to pin 4 by manipulation of switch 14 or switch 18 or, if wall switch 14 is left open, until power supply capacitor 82 becomes discharged. Depending upon its size, capacitor 82 may keep circuit 38 powered and 108 in its state for a period ranging from 15 seconds up to several hours.

A second R-C circuit 98 consists of capacitor 99 and resistor 100. Resistor 100 pulls the input (pin 4) of one-shot 92 to logic zero when the manually operable switch 18 of switching device 10 is opened. Capacitor 99 provides debouncing of the switch 18 contacts.

One-shot 92 is connected as shown in FIG. 5 to a second one-shot 102, which is also employed as a debouncer. In particular, connected to one-shot 102 is a R-C circuit 103 consisting of a capacitor 104 and a resistor 106. The time constant of R-C circuit 103 is made longer than the time constant of circuit 97. This is because the oscillations of the output of 92 are of longer duration than the 60 hertz oscillations which R-C circuit 97 keeps from effecting a state change of one-shot 92.

The output side of debounce circuit one-shot 102 is connected to a conventional flip-flop 108, which changes state when the output of one-shot 102 changes states from OFF to ON. When flip-flop 108 changes state, it outputs a signal which is amplified in the circuit 110 consisting of transistor 112 and resistor 114 and applied to the driver 116 of a Triac load switch 118. Triac 118 completes the continuity in the load circuit 119 between power source 78 and lamp 8 to turn the lamp ON if power is available at wall outlet 12. Driver 116 is an optically coupled Triac driver in which the output Triac is energized when the optically coupled LED in ON. The Triac 122 of driver 116 is connected to the main, load circuit Triac 118 through a limiting resistor 124 as is conventional in Triac circuits. When the Triac 122 of driver 116 is turned ON, the load circuit Triac 118 is switched to a conductive state to turn ON lamp 8.

Also found in operating circuit 38 and connected up in the manner shown in FIG. 5 is a snubber circuit 130 composed of a varistor 132 and a serially wired capacitor 134 and resistor 136 connected across the varistor. Circuit 130 protects Triac 118 and keeps voltage spikes and other transients from turning on load circuit Triac 118.

It was pointed out above that the operating circuit 38 of switching device 10 is so set up that the operating circuit can be powered by capacitor 82 for a period determined by the capacity of that device when wall switch 14 is in the OFF state. Specifically, the discharge of capacitor 82 appears at VDD and is applied at the similarly identified terminals to one-shots 92 and 102 and to flip-flop 108 to operate those circuit devices when wall switch 14 is moved to and left in the OFF state.

The following table shows the states and manipulation of wall switch 14 and the switch 18 of device 10 and the effect of the subject manipulations on the state of bedside lamp 8.

TABLE 1

| State of Switch 14 | State of Switch 18 | State of Load 8 | Manipulation | Effect on Load Circuit Control Device 10 | Resulting State of Load 8 |
| --- | --- | --- | --- | --- | --- |
| ON | ON | Not Powered | Switch 14 OFF then ON | Reverses State (OFF to ON) | Powered |
| ON | ON | Powered | Switch 14 OFF then ON | Reverses State (ON to OFF) | Not Powered |
| ON | ON | Not Powered | Switch 18 OFF then ON | Reverses State (OFF to ON) | Powered |
| ON | ON | Powered | Switch 18 OFF then ON | Reverses State (ON to OFF) | Not Powered |

Table 2 below shows in more detail the effect of manipulating switches 14 and 18.

TABLE 2

| State of Switch 14 | State of Switch 18 | State of Load 8 | Manipulation | Effect on Load Circuit Control Device 10 | Resulting State of Load 8 |
| --- | --- | --- | --- | --- | --- |
| ON | ON | OFF | Switch 14 ON to OFF | Reverses State (OFF to ON) | OFF |
| OFF | ON | OFF | Switch 14 OFF to ON | None (Stays ON) | ON |
| ON | ON | ON | Switch 14 ON to OFF | Reverses State (ON to OFF) | OFF |
| OFF | ON | OFF | Switch 14 OFF to ON | None (Stays OFF) | OFF |
| ON | ON | OFF | Switch 18 ON to OFF | Reverses State (OFF to ON) | ON |
| ON | OFF | ON | Switch 18 OFF TO ON | None (Stays ON) | ON |
| ON | ON | ON | Switch 18 ON to OFF | Reverses State (ON to OFF) | OFF |
| ON | OFF | OFF | Switch 18 OFF to ON | None (Stays OFF) | OFF |

Figure 3:
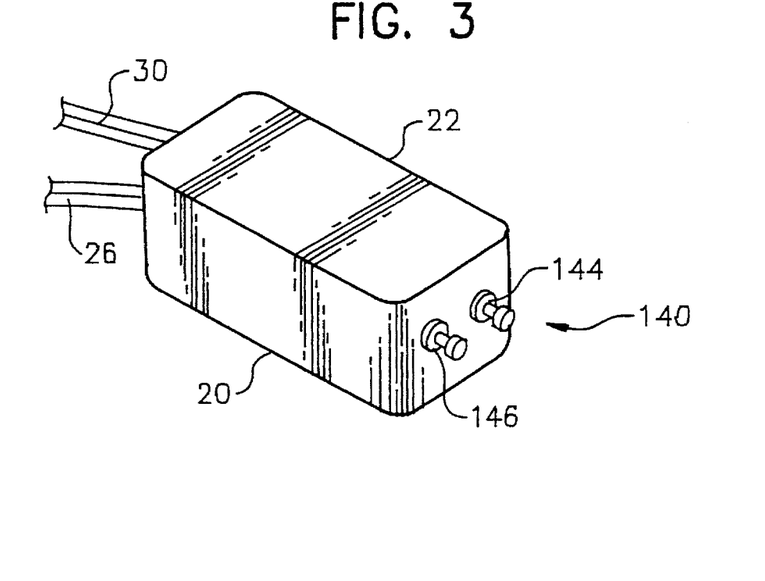
FIGS. 3 and 4 are pictorial views of two other control devices embodying the principles of the present invention.
Figure 6:
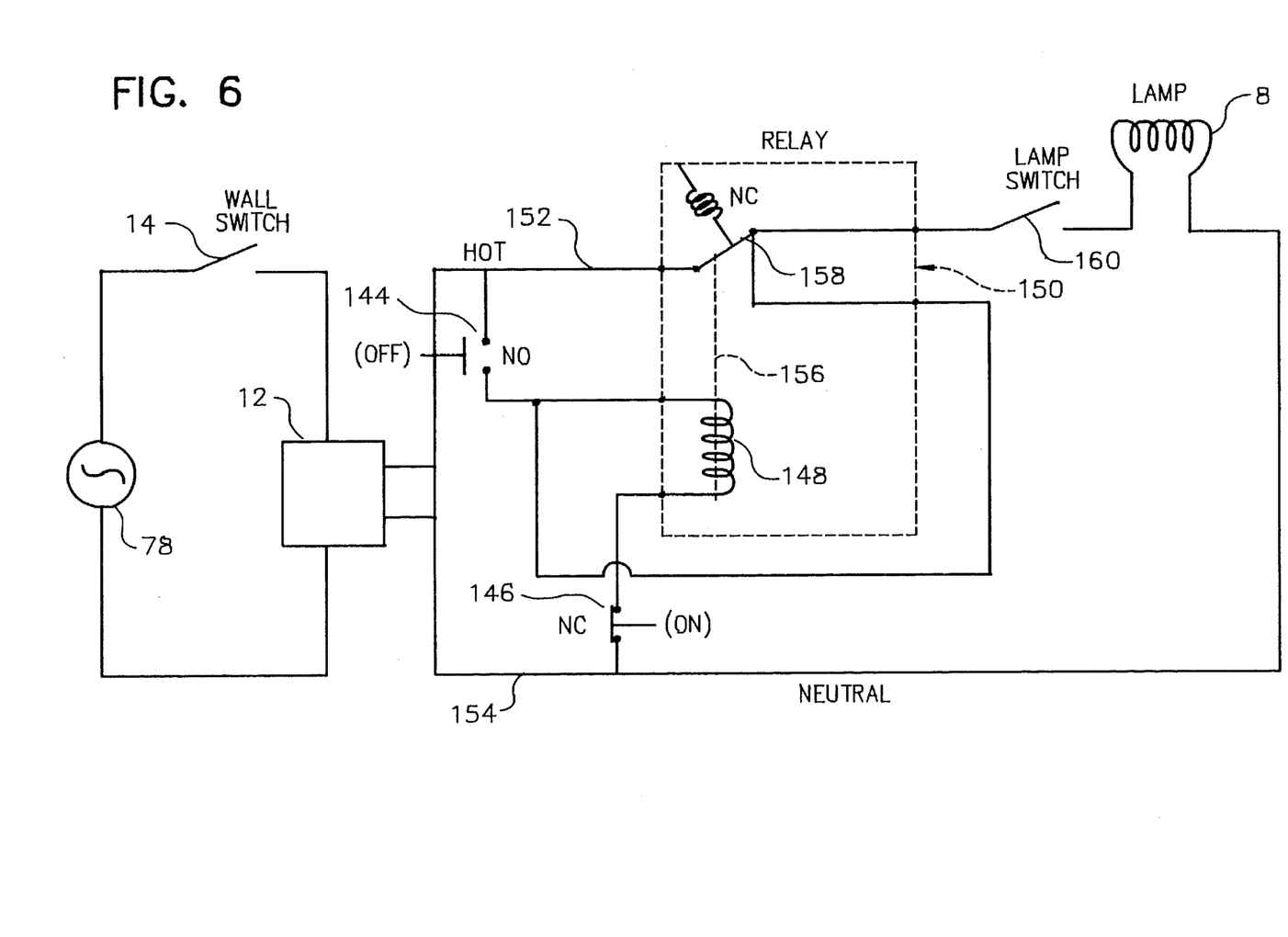
FIG. 6 is an electrical schematic of an alternate operating circuit for the control device of FIG. 3.

As will be apparent from the foregoing, the operating circuit 38 of switching device 10 is so set up that flip-flop 108 is triggered by the leading edge of a pulse appearing on its input. Alternatively, the operating circuit of the switching device can be set up so the trailing edge of the pulse instead of its leading edge will effect the flip-flop 108 state change. Truth Table 1 also describes the operation of this alternative operating circuit.

and off by closing and opening the manually operable switches 146 and 144 of switching device 140. At the same time, the lamp can be turned on by closing and opening wall switch 14.

A truth table showing how the manipulation of wall switch 14 and the switches 144 and 146 affects the state of lamp 8 follows.

| State of Switch 14 | ON SWITCH State of Switch 146 | OFF SWITCH State Switch 144 | State of Load Device 8 | Manipulation | Effect on the State of Control Device 140 | Resulting State of Load Device 8 |
| --- | --- | --- | --- | --- | --- | --- |
| ON | ON | ON | OFF | Switch 14 ON to OFF | Reverses (OFF to ON) | OFF |
| OFF | ON | ON | OFF | Switch 14 OFF to ON | None (Stays ON) | ON |
| ON | ON | ON | ON | Switch 14 ON to OFF | None (Stays ON) | OFF |
| OFF | ON | ON | OFF | Switch 14 OFF to ON | None (Stays ON) | ON |
| ON | ON | ON | OFF | Switch 146 ON to OFF | Reverses (OFF to ON) | ON |
| ON | OFF | ON | ON | Switch 146 OFF to ON | None (Stays ON) | ON |
| ON | ON | ON | ON | Switch 144 OFF to ON | Reverses (ON to OFF) | OFF |
| ON | ON | OFF | OFF | Switch 144 ON to OFF | None (Stays OFF) | OFF |

The exemplary switching devices discussed above employ a single, biased closed switch 18. This switch is opened by depressing it, and the switch automatically closes upon being released. An alternative is to employ a pair of complementary on and off switches. A switching device of that character is depicted in FIGS. 3 and 6 and identified by reference character 140. The on and off switches are respectively identified by reference characters 146 and 144.

Normally open (off) and normally closed (on) switches 144 and 146 are connected in series with the coil 148 of a conventional electromagnetic relay 150 across wall outlet 12 by the leads 152 and 154 of an external line cord such as the one identified by reference character 26 in FIG. 1.

Relay 150 also has an armature 156 and a normally closed contact 158. Consequently, with lamp switch 160 closed and power available at wall outlet 12, lamp 8 can be turned on Switches 144 and 146 and the associated operating circuitry can be housed in a casing of the character discussed above, illustrated in FIG. 2, and identified with reference characters 20 and 22.

Figure 4:
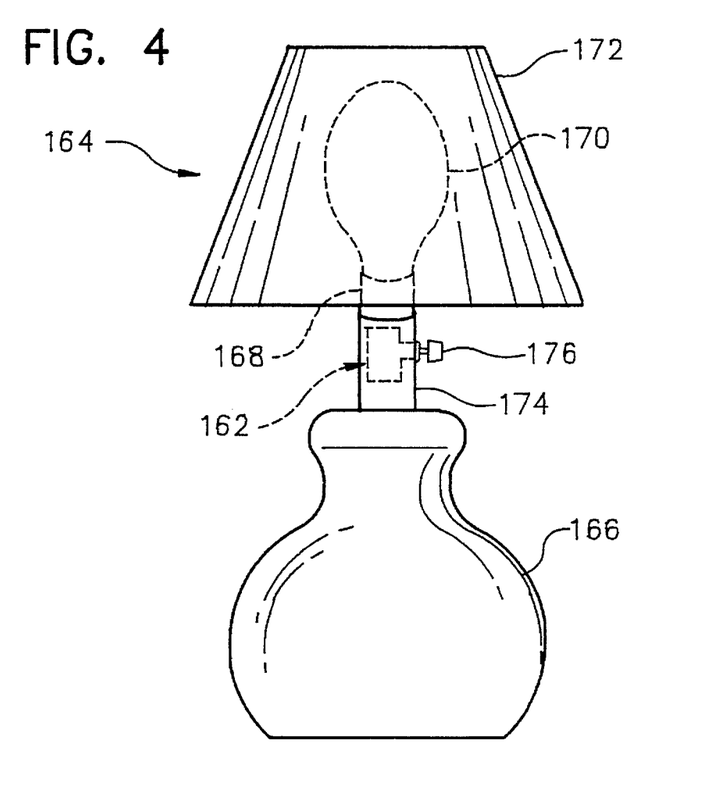

FIG. 4 depicts yet another embodiment of the present invention. In this case, the load circuit control device 162 is employed to turn lamp 164 on and off at the bedside or other location of the lamp. Lamp 164 includes a base 166, a socket 168 into which the lamp bulb 170 is screwed, and a shade 172. The control device 162 employed to energize and deenergize bulb 170 at the lamp location is installed in the hollow stem 174 of the lamp immediately below socket 168 with an operator-actuatable switch 176 readily accessible. Control device 162 may, but does not have to be, of the character illustrated in FIGS. 1 and 2 and discussed above.

The invention may be embodied in many forms without departing from the spirit or essential characteristics of the invention. The present embodiments are therefore to be considered in all respects as illustrative and not restrictive. The scope of the invention is indicated by the appended claims rather than by the foregoing description, and all changes which come within the meaning and range of equivalency of the claims are therefore intended to be embraced therein.

What is claimed is:

1. The combination of: an electrical load device, an electrical outlet, a first operator-actuatable switch means for completing and interrupting a connection between said outlet and an electrical power source, and a control device with an input which can be electrically connected to said electrical outlet and an outlet to which said load device can be electrically connected, said control device also including a load circuit switch for completing a load circuit between said outlet and said load device; a second, operator actuatable switch means; and circuit means so incorporating said load circuit switch that a change in the state of either of said first and second operator actuatable switch means will effect a change in the state of the load circuit switch resulting in a completion or interruption of said load circuit, said first and second operator actuatable switch means each having an ON state and an OFF state, said load circuit switch having active and inactive states, and the circuit means of the control device being so constructed that the manipulation of said first and second operator-actuatable switch means affects the load circuit switch as follows:

| State of First Switch | State of Second Switch | State of Load | Manipulation | Effect on Load Circuit Control Switch | Resulting State of Load |
|---|---|---|---|---|---|
| ON | ON | Not Powered | First Switch OFF then ON | Reverses State | Powered |
| ON | ON | Powered | First Switch OFF then ON | Reverses State | Not Powered |
| ON | ON | Not Powered | Second Switch OFF then ON | Reverses State | Powered |
| ON | ON | Powered | Second Switch OFF then ON | Reverses State | Not Powered. |

2. The combination of: an electrical load device, an electrical outlet, a first operator-actuatable switch means for completing and interrupting a connection between said outlet and an electrical power source, and a control device with an input which can be electrically connected to said electrical outlet and an outlet to which said load device can be electrically connected, said control device also including a switch for completing a load circuit between said outlet and said load device; a second, operator actuatable switch means; and circuit means so incorporating said load circuit switch that a change in the state of either of said operator actuatable switch means will effect a change in the state of the load circuit switch resulting in a completion or interruption of said load circuit, said circuit means comprising a load circuit switch driver means and an integral power supply for activating said driver means during periods when electrical power is not available at said outlet.

3. A combination as defined in claim 2 in which said integral power supply comprises capacitor means.

4. A combination as defined in claim 2 in which said second switch means comprises a single, biased closed switch.

5. A combination as defined in claim 2 in which said second switch means comprises a normally open switch which is manually manipulatable to initiate the completion of the electrical connection between the outlet and the load device and a normally closed switch which is manually manipulatable to initiate the interruption of said electrical connection.

6. A combination as defined in claim 5 which comprises a relay having a contact connected in series between said outlet and said load device and a coil connected across leads from said outlet to said load device in series with said normally closed and normally open switches.

7. A combination as defined in claim 2 in which said second switch means and said circuit means are incorporated in said control device, the control device having means for selectively connecting said device to said outlet and to said load device.

8. The combination of: an electrical load device, an electrical outlet, a first operator actuatable switch means for completing and interrupting a connection between said outlet and an electrical power source, and an electrical load circuit control device with an input which can be electrically connected to said electrical outlet and an output to which said load can be electrically connected, said control device including a second, operator actuatable switch for completing a circuit between said electrical outlet and said load device and circuit means so relating the operation of said first and second, operator actuatable switches as to control the operation of the load device as follows:

| State of First Switch | State of Second Switch | State of Load | Manipulation | Effect on Load Circuit Control Device | Resulting State of Load |
|---|---|---|---|---|---|
| ON | ON | OFF | First Switch ON to OFF | Reverses State | OFF |
| OFF | ON | OFF | First Switch OFF to ON | None | ON |
| ON | ON | ON | First Switch ON to OFF | Reverses State | OFF |
| OFF | ON | OFF | First Switch OFF to ON | None | OFF |
| ON | ON | OFF | Second Switch On to OFF | Reverses State | ON |
| ON | OFF | ON | Second Switch | None | ON |

-continued

| State of First Switch | State of Second Switch | State of Load | Manipulation | Effect on Load Circuit Control Device | Resulting State of Load |
|---|---|---|---|---|---|
| ON | ON | ON | OFF to ON Second Switch | Reverses State | OFF |
| ON | OFF | OFF | ON to OFF Second Switch OFF to ON | None | OFF |

9. The combination of: an electrical load device, an electrical outlet, a first operator actuatable switch means for completing and interrupting a connection between said outlet and an electrical power source, and an electrical load circuit control device with an input which can be electrically connected to said electrical outlet and an output to which said load can be electrically connected, said device including second and a third, operator actuatable switch means for completing and interrupting a circuit between said electrical outlet and said load device and circuit means so relating the operation of said first, second, and third operator actuatable switches as to control the operation of the load device as follows:

| State of First Switch | State of Second Switch | State of Third Switch | State of Load Device | Manipulation | Effect on the State of Control Device | Resulting State of Load Device |
|---|---|---|---|---|---|---|
| ON | ON | ON | OFF | First Switch ON to OFF | Reverses | OFF |
| OFF | ON | ON | OFF | First Switch OFF to ON | None | ON |
| ON | ON | ON | ON | First Switch ON to OFF | None | OFF |
| OFF | ON | ON | OFF | First Switch OFF to ON | None | ON |
| ON | ON | ON | OFF | Second Switch ON to OFF | Reverses | ON |
| ON | OFF | ON | ON | Second Switch OFF to ON | None | ON |
| ON | ON | ON | ON | Third Switch OFF to ON | Reverses | OFF |
| ON | ON | OFF | OFF | Third Switch ON to OFF | None | OFF |

10. A load control device which comprises a manually operable switch means and which can be selectively connected between a switched source of electrical power and a load device such that electrical power can be made available to and removed from said load device by manipulation of a switch controlling said switched source or by the manipulation of the manually operable switch means in the load control device.

11. A load control device as defined in claim 10 which comprises a load switch activated by the closing of the manually operable switch means to establish continuity between input and output means of the standalone circuit means.

12. A load control device as defined in claim 11 which comprises a load circuit switch and means for latching the load circuit switch in a closed, circuit-completing state.

13. A load control device as defined in claim 12 which comprises a driver for said load circuit switch and an integral power supply for activating said driver during periods when electrical power is not available at the switched source of electrical power.

14. A load control device as defined in claim 13 in which said integral power supply comprises capacitor means.

15. A load control device as defined in claim 10 which comprises a load circuit switch and means that keeps contact bounce from activating and/or deactivating the load circuit switch.

16. A load control device as defined in claim 15 which comprises a driver circuit for the load circuit switch and means for latching the driver circuit in a closed, circuit-completing state.

17. The combination of: an electrical load device, an electrical outlet, a first operator-actuatable switch means for completing and interrupting a connection between said outlet and an electrical power source, and a control device with an input which can be electrically connected to said electrical outlet and an outlet to which said load device can be electrically connected, said control device also including a switch for completing a load circuit between said outlet and said load device; a second, operator actuatable switch means; and circuit means so incorporating said load circuit switch that a change in the state of either of said operator actuatable switch means will effect a change in the state of the load circuit resulting in a completion or interruption of said load circuit, said circuit means comprising means that keeps contact bounce in said first and second switch means from effecting a change in the state of load circuit switch.

* * * * *